United States Patent
Bin Sediq et al.

(10) Patent No.: US 12,063,676 B2
(45) Date of Patent: Aug. 13, 2024

(54) INTER-MODULATION AVOIDANCE FOR TRANSMISSION ON DIFFERENT FREQUENCIES

(71) Applicant: Telefonaktiebolaget LM Ericsson (publ), Stockholm (SE)

(72) Inventors: Akram Bin Sediq, Kanata (CA); Mikael Wittberg, Uppsala (SE); Petter Blomberg, Spånga (SE); Martin Skarve, Enebyberg (SE); Hatem Abou-Zeid, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 388 days.

(21) Appl. No.: 17/441,023

(22) PCT Filed: May 6, 2019

(86) PCT No.: PCT/IB2019/053703
§ 371 (c)(1),
(2) Date: Sep. 20, 2021

(87) PCT Pub. No.: WO2020/225589
PCT Pub. Date: Nov. 12, 2020

(65) Prior Publication Data
US 2022/0167369 A1    May 26, 2022

(51) Int. Cl.
*H04W 72/542* (2023.01)
*H04L 1/1829* (2023.01)

(52) U.S. Cl.
CPC ......... *H04W 72/542* (2023.01); *H04L 1/1864* (2013.01)

(58) Field of Classification Search
CPC ............... H04W 72/542; H04W 24/08; H04W 72/0453; H04W 72/0473; H04W 74/0808;
(Continued)

(56) References Cited

U.S. PATENT DOCUMENTS

| | | | |
|---|---|---|---|
| 9,526,109 B1 | 12/2016 | Wurtenberger et al. | |
| 2016/0330756 A1* | 11/2016 | Sun | H04W 72/1215 |

(Continued)

FOREIGN PATENT DOCUMENTS

| | | |
|---|---|---|
| EP | 3648394 A1 | 5/2020 |
| EP | 3651530 A1 | 5/2020 |
| WO | 2014/047894 A1 | 4/2014 |
| WO | 2019/014865 A1 | 1/2019 |
| WO | 2019/047217 A1 | 3/2019 |
| WO | 2019/006736 A1 | 10/2019 |

OTHER PUBLICATIONS

International Search Report and Written Opinion dated Jan. 23, 220 issued in PCT Application No. PCT/IB2019/053703, consisting of 14 pages.
(Continued)

*Primary Examiner* — Rushil P. Sampat
(74) *Attorney, Agent, or Firm* — Sage Patent Group

(57) ABSTRACT

A method, system and network node are disclosed. A network node for communication with a wireless device that is configured for uplink transmission on a first carrier using a first Radio Access Technology (RAT) and on a second carrier using a second RAT is provided. The network node includes processing circuitry configured to determine whether to schedule the wireless device for uplink and whether to schedule the wireless device for uplink and downlink communications, in a transmission time interval (TTI) according to the first RAT based at least in part on an intermodulation distortion quantity associated with uplink communications according to both the first RAT and the second RAT, and optionally schedule the wireless device according to the determination.

19 Claims, 7 Drawing Sheets

(58) Field of Classification Search
CPC ...... H04W 24/10; H04L 1/1864; H04L 5/001; H04L 5/0062; H04B 17/318; H04B 17/336
See application file for complete search history.

(56) References Cited

U.S. PATENT DOCUMENTS

| | | | |
|---|---|---|---|
| 2018/0213557 A1 | 7/2018 | He | |
| 2018/0368199 A1* | 12/2018 | Zeng | H04W 72/21 |
| 2019/0082337 A1* | 3/2019 | Gheorghiu | H04L 5/001 |
| 2019/0342888 A1* | 11/2019 | Hosseini | H04W 72/20 |

OTHER PUBLICATIONS

Ericsson, 3GPP TSG-RAN WG1 90bis; R1-1718521; Title: "On Single-UL Transmission and DL/UL TDM"; Agenda Item: 7.5; Document for: Discussion and Decision; Prague, Czech Republic, Oct. 9-13, 2017, consisting of 2 pages.

Torbjorn et al. "Simplifying the 5G Ecosystem by Reducing Architecture Options", Nov. 30, 2018.

Wikipedia Contributors, "Intermodulation," Wikipedia, The Free Encyclopedia, https://en.wikipedia.org/w/index.php?title=Intermodulation&oldid=853755554 (accessed Nov. 27, 2018), consisting of 3 pages.

Yilmaz et al., "LTE-NR Tight-Interworking and the First Steps to 5G," Ericsson Research Blog, Nov. 21, 2017, consisting of 2 pages.

3GPP TS 38.101-3 V15.3.0 (Sep. 2018) 3rd Generation Partnership Project; Technical Specification Group Radio Access Network; NR; User Equipment (UE) Radio Transmission and Reception; Part 3: Range 1 and Range 2 Interworking Operation with Other Radios (Release 15), consisting of 196 pages.

3GPP TS 38.425 v15.3.0 (Sep. 2018) 3rd Generation Partnership Project; Technical Specification Group Radio Access Network; NG-RAN; NR User Plane Protocol (Release 15), consisting of 22 pages.

* cited by examiner

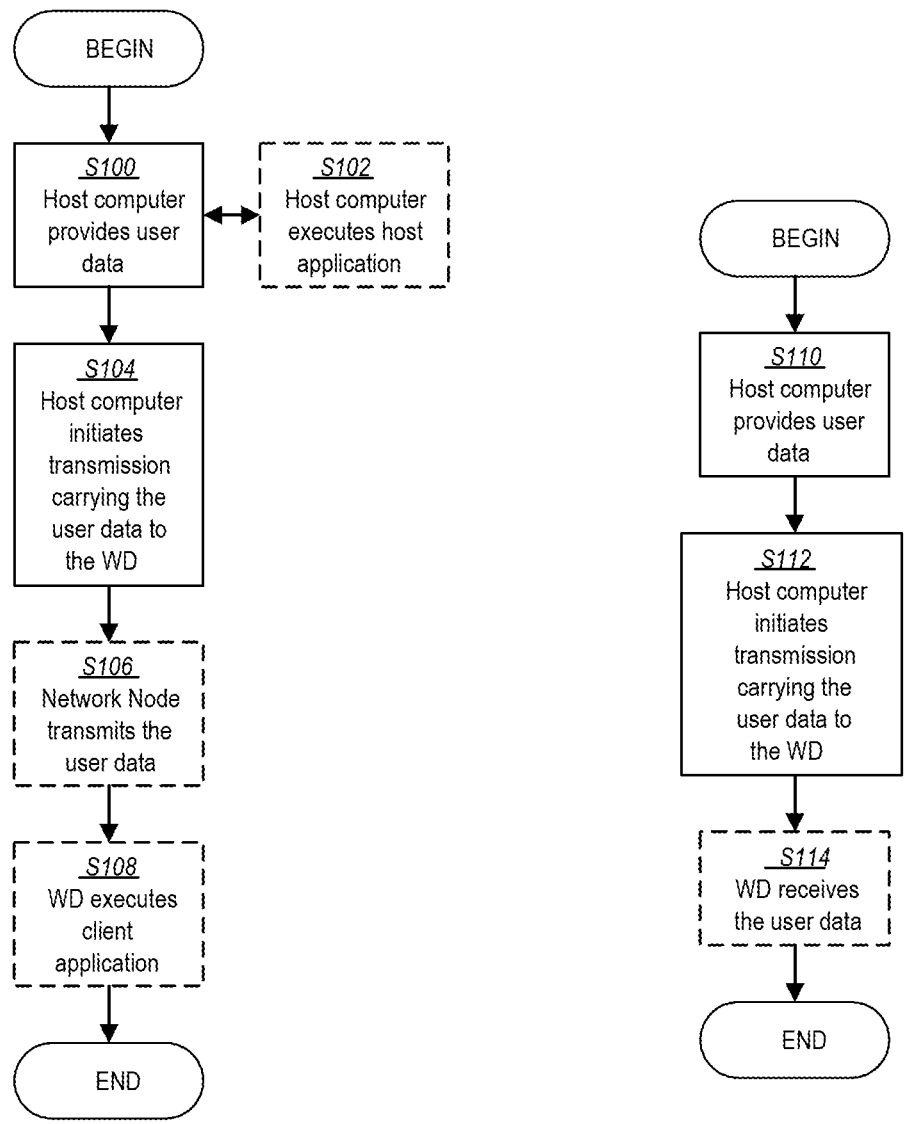

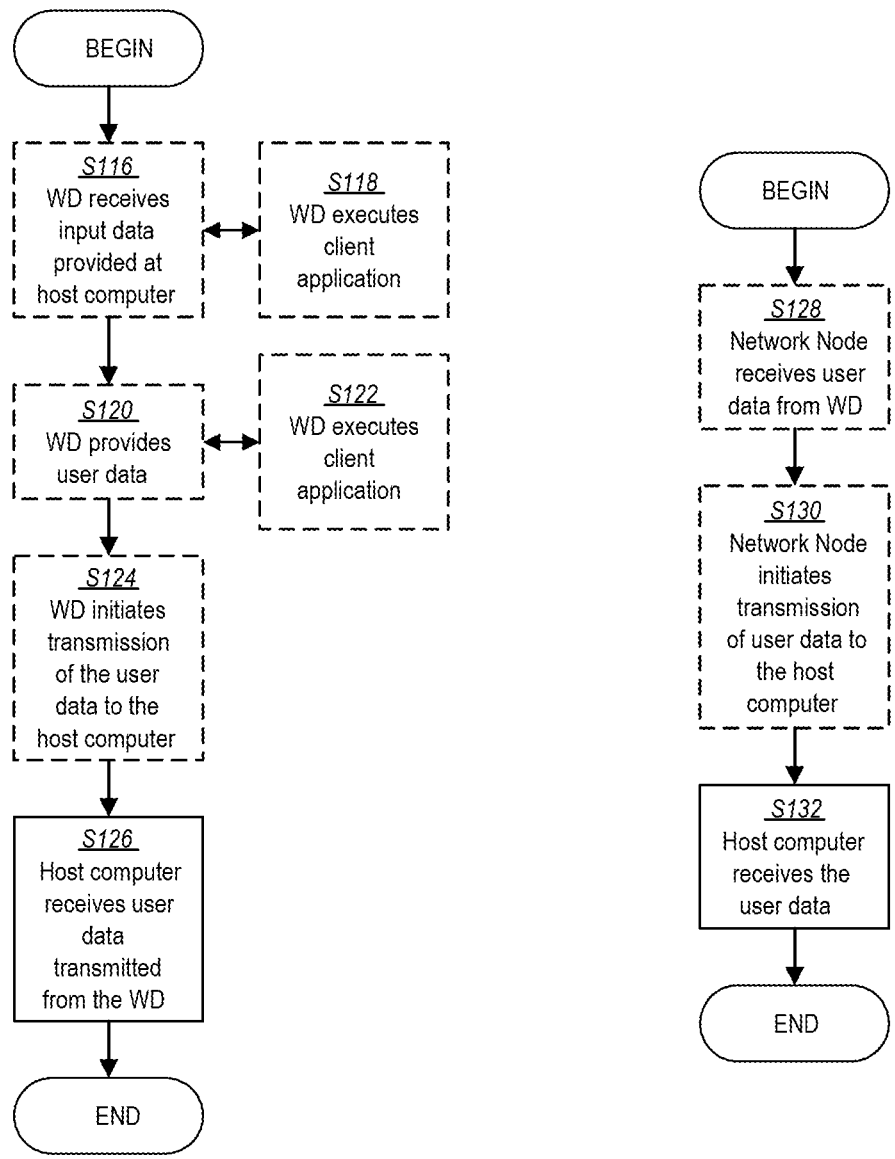

| | Bits | | | | | | | | Number of Octets |
|---|---|---|---|---|---|---|---|---|---|
| | 7 | 6 | 5 | 4 | 3 | 2 | 1 | 0 | |
| | PDU Type (=0) | | | Spare | DL Discard Blocks | DL Flush | Report polling | 1 |
| | Spare | | (IMD Flag) | | Report Delivered | User data existence flag | Assistance Info. Report Polling Flag | Retransmission flag | 1 |
| | NR-U Sequence Number | | | | | | | | 3 |

FIG. 9

INTER-MODULATION AVOIDANCE FOR TRANSMISSION ON DIFFERENT FREQUENCIES

CROSS-REFERENCE TO RELATED APPLICATIONS

This application is a Submission Under 35 U.S.C. § 371 for U.S. National Stage Patent Application of International Application Number: PCT/IB2019/053703, filed May 6, 2019 entitled "INTER-MODULATION AVOIDANCE FOR TRANSMISSION ON DIFFERENT FREQUENCIES," the entirety of which is incorporated herein by reference.

TECHNICAL FIELD

Wireless communication and in particular, helping avoid intermodulation in wireless communication system implementing transmissions at different frequencies.

BACKGROUND

Long Term Evolution (LTE)-New Radio (NR) Dual Connectivity (LTE-NR DC)

Third generation partnership project (3GPP) standardization has specified several deployment options for $5^{th}$ Generation (5G, also referred to as "New Radio" (NR)), which are summarized in Table 1 below. Three of these deployment options require dual connectivity between LTE or evolved LTE (eLTE) and NR, i.e., options 3, 4, 7, in which wireless device data can be carried through either LTE (or eLTE) and/or NR. Option 3 is named E-UTRA-NR Dual Connectivity (EN-DC), where LTE is the master radio access technology (RAT), the Evolved Packet Core (EPC) is the core network, and NR is the secondary Radio Access Technology (RAT). Option 4 is named NR-E-UTRA-Dual Connectivity (NE-DC), where NR is the master RAT, 5G Core (5GC) is the core network, and eLTE is the secondary RAT. Option 7 is named NG-RAN E-UTRA-NR Dual Connectivity, where eLTE is the master RAT, 5GC is the core network, and NR is the secondary RAT.

TABLE 1

| Connectivity Option | Core Network | Master RAT | Secondary RAT | 3GPP term | 3GPP Release |
|---|---|---|---|---|---|
| Option 1 | EPC | LTE | . . . | LTE | Rel. 8 |
| Option 3 | EPC | LTE | NR | EN-DC | Rel. 15, December 2017 |
| Option 2 | 5GC | NR | . . . | NR | Rel. 15, June 2018 |
| Option 4 | 5GC | NR | eLTE | NE-DC | Rel. 15, March 2019 |
| Option 5 | 5GC | eLTE | . . . | eLTE | Rel. 15, June 2018 |
| Option 7 | 5GC | eLTE | NR | NGEN-DC | Rel. 15, March 2019 |

Intermodulation Distortion (IMD)

Intermodulation (IM) is also referred to as intermodulation distortion (IMD), both of which are used interchangeably herein, and is an amplitude modulation of signals including two or more different frequencies caused by nonlinearities and/or time variance in a communication system. The intermodulation between frequency components may generate additional components at frequencies that are at harmonic frequencies (integer multiples) of either, like harmonic distortion, and may also generate additional components at the sum and difference frequencies of the original frequencies, and at sums and differences of multiples of those frequencies.

When the wireless device transmits on the uplink (UL) in both LTE and NR simultaneously, there is a potential problem of IMD that may interfere with the reception of the downlink (DL) transmission in LTE and/or NR, depending on the LTE and NR UL and DL band and channel allocations. For instance, IMD generated by simultaneous UL transmissions in LTE and NR may interfere with LTE DL transmissions in the following deployments:

LTE UL carrier is deployed in the range [1710 MHz, 1730];
LTE DL carrier in the range [1805 MHz, 1825 MHz]; and
NR carrier is deployed in TDD band [3515 MHz, 3575 MHz]

The amount of degradation in DL LTE and/or DL NR due to IMD may depend on the actual resource blocks allocated to the wireless device in uplink LTE and uplink NR, as well as the actual transmission power in the UL in LTE and NR, where one or more of these properties of transmission may cause severe degradation to DL LTE and/or DL NR.

SUMMARY

Some embodiments advantageously provide a method, network node and system for helping avoid intermodulation in wireless communication systems implementing transmissions at different frequencies.

According to aspect of the disclosure, a network node for communication with a wireless device that is configured for uplink transmission on a first carrier using a first Radio Access Technology, RAT, and on a second carrier using a second RAT is provided. The network node includes processing circuitry configured to determine whether to schedule the wireless device for uplink and downlink communications, in a transmission time interval, TTI, according to the first RAT based at least in part on an intermodulation distortion quantity associated with uplink communications according to both the first RAT and the second RAT, and optionally schedule the wireless device according to the determination.

According to one or more embodiments of this aspect, the intermodulation distortion quantity associated with uplink communications according to both the first RAT and second RAT corresponds to a threshold quantity. According to one or more embodiments of this aspect, the threshold quantity is based at least in part on previously received Hybrid Automatic Repeat Request, HARQ, feedbacks. According to one or more embodiments of this aspect, the processing circuitry is further configured to schedule the wireless device for uplink and downlink communications according to the first RAT where a number of resources used for the downlink communication according to the first RAT is based at least in part on the intermodulation distortion quantity.

According to one or more embodiments of this aspect, the first RAT is a Long Term Evolution, LTE, based wireless communication protocol and the second RAT is a New Radio, NR, based wireless communication protocol. According to one or more embodiments of this aspect, the intermodulation distortion quantity is set to a quantity that prevents scheduling of the downlink communication according to the first RAT. According to one or more embodiments of this aspect, the processing circuitry is further configured to avoid scheduling uplink communication, in the TTI, according to the first RAT if downlink communication according to the first RAT is scheduled in the TTI.

According to one or more embodiments of this aspect, the processing circuitry is further configured to avoid scheduling downlink communication, in the TTI, according to the first RAT if the uplink communication according to the first RAT is scheduled in the TTI. According to one or more embodiments of this aspect, the processing circuitry is further configured to receive, over a backhaul communications link, an indication indicating whether uplink communication according to the second RAT is scheduled. The determination whether to schedule the wireless device for uplink and downlink communications, in the TTI, according to the first RAT is based at least in part on the indication. According to one or more embodiments of this aspect, the determination whether to schedule the wireless device for uplink and downlink communications, in the TTI, according to the first RAT is based at least in part on a quality of service class associated with one of the uplink communication and downlink communication, in the TTI, according to the first RAT.

According to another aspect of the disclosure, a method for a network node that is in communication with a wireless device that is configured to for uplink transmission on a first carrier using a first Radio Access Technology, RAT, and on a second carrier using a second RAT. A determination is made whether to schedule the wireless device for uplink and downlink communications, in a transmission time interval, TTI, according to the first RAT based at least in part on an intermodulation distortion quantity associated with uplink communications according to both the first RAT and the second RAT. The wireless device is optionally scheduled according to the determination.

According to one or more embodiments of this aspect, the intermodulation distortion quantity associated with uplink communications according to both the first RAT and second RAT corresponds to a threshold quantity. According to one or more embodiments of this aspect, the threshold quantity is based at least in part on previously received Hybrid Automatic Repeat Request, HARQ, feedbacks. According to one or more embodiments of this aspect, the wireless device for uplink and downlink communications is scheduled according to the first RAT where a number of resources used for the downlink communication according to the first RAT is based at least in part on the intermodulation distortion quantity.

According to one or more embodiments of this aspect, the first RAT is a Long Term Evolution, LTE, based wireless communication protocol and the second RAT is a New Radio, NR, based wireless communication protocol. According to one or more embodiments of this aspect, the intermodulation distortion quantity is set to a quantity that prevents scheduling of the downlink communication according to the first RAT. According to one or more embodiments of this aspect, a scheduling of uplink communication, in the TTI, according to the first RAT is avoided if downlink communication according to the first RAT is scheduled in the TTI.

According to one or more embodiments of this aspect, a scheduling of downlink communication, in the TTI, according to the first RAT is avoided if the uplink communication according to the first RAT is scheduled in the TTI. According to one or more embodiments of this aspect, an indication indicating whether uplink communication according to the second RAT is scheduled is received over a backhaul communication link. The determination whether to schedule the wireless device for uplink and downlink communications, in the TTI, according to the first RAT is based at least in part on the indication. According to one or more embodiments of this aspect, the determination whether to schedule the wireless device for uplink and downlink communications, in the TTI, according to the first RAT is based at least in part on a quality of service class associated with one of the uplink communication and downlink communication, in the TTI, according to the first RAT.

According to another aspect of the disclosure, a network node for communication with a wireless device that is configured for uplink transmission on a first carrier using a first Radio Access Technology, RAT, and on a second carrier using a second RAT, is provided. The network node includes processing circuitry configured to determine whether to schedule the wireless device for uplink and downlink communications, in a transmission time interval, TTI, according to the first RAT based at least in part on an intermodulation distortion threshold quantity associated with uplink communications according to both the first RAT and the second RAT. The processing circuitry is further configured to optionally schedule the wireless device according to the determination. The intermodulation threshold quantity is based at least in part on one of previously received Hybrid Automatic Repeat Request, HARQ, feedback, and a Physical Resource Block, PRB, allocation for the first RAT.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a flowchart illustrating exemplary methods implemented in a communication system including a host computer, a network node and a wireless device for executing a client application at a wireless device according to some embodiments of the present disclosure;

FIG. 4 is a flowchart illustrating exemplary methods implemented in a communication system including a host computer, a network node and a wireless device for receiving user data at a wireless device according to some embodiments of the present disclosure;

FIG. 5 is a flowchart illustrating exemplary methods implemented in a communication system including a host computer, a network node and a wireless device for receiving user data from the wireless device at a host computer according to some embodiments of the present disclosure;

FIG. 6 is a flowchart illustrating exemplary methods implemented in a communication system including a host computer, a network node and a wireless device for receiving user data at a host computer according to some embodiments of the present disclosure;

FIG. 9 is a diagram of a portion of a downlink wireless device data frame.

DETAILED DESCRIPTION

Figure 1:
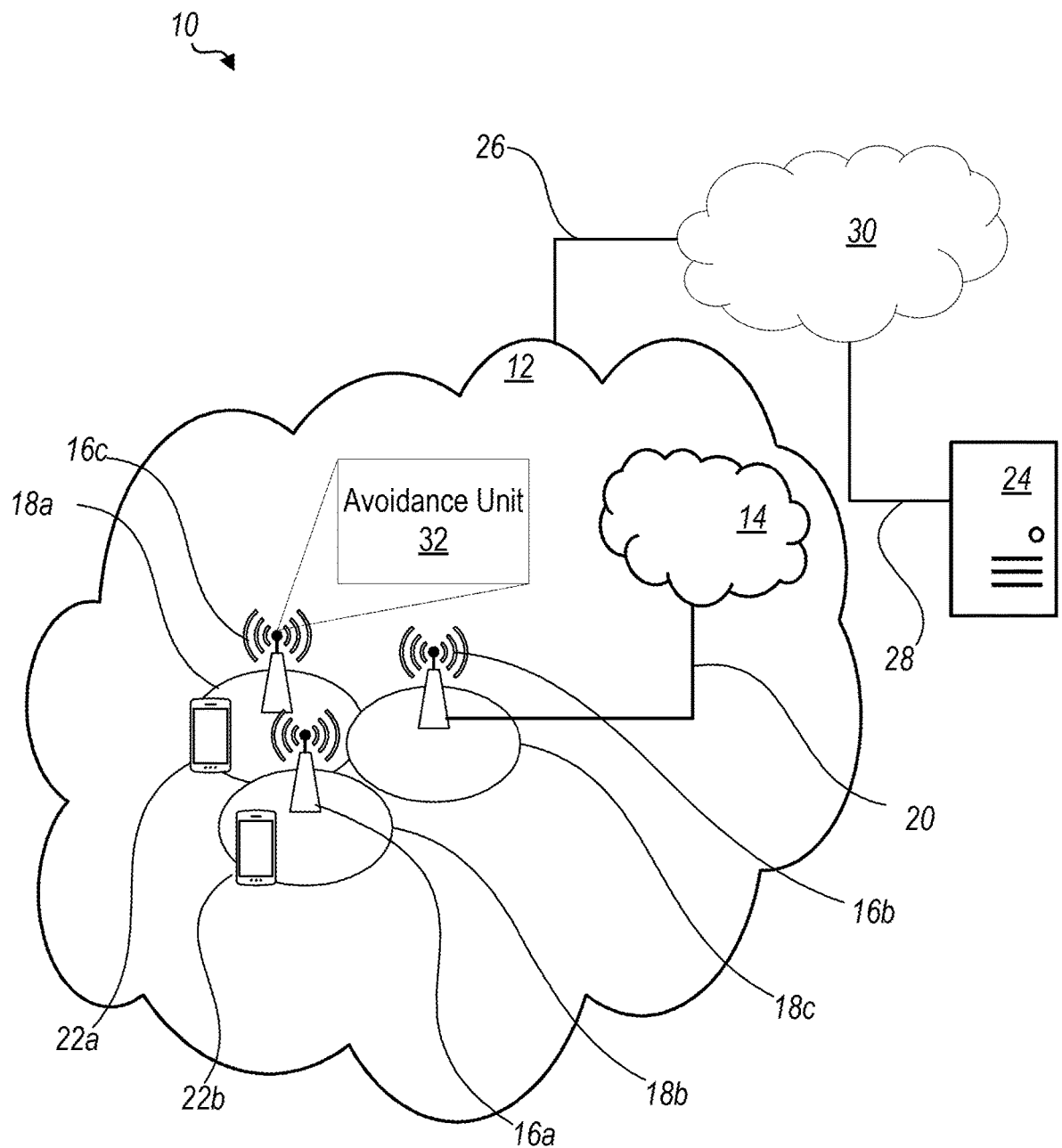
FIG. 1 is a schematic diagram of an exemplary network architecture illustrating a communication system connected via an intermediate network to a host computer according to the principles in the present disclosure.

As discussed above, intermodulation distortion (IMD) may be caused in wireless communication systems by simultaneous LTE and NR transmissions in the uplink for LTE-NR DC, for example, which may negatively affect downlink transmissions. One way to try to solve the IMD issue in LTE-NR DC is to use single uplink operation where the wireless device does not simultaneously transmit LTE and NR in the uplink. Simultaneous transmission may be prevented by coordination of uplink scheduling in LTE and NR. Prevention of simultaneous transmission also may require the LTE and NR networks to be synchronized. In other words, prevention of simultaneous transmission by coordination between LTE network node and NR network may increase the complexity of the system and add to the unnecessary coupling between LTE and NR which also increases the cost of maintaining these networks.

Further, the coordination can be performed in a static time-division multiplexing (TDM) method where a one set of TTIs (e.g., subframes) are reserved for UL LTE and another set of non-overlapping slots are reserved for UL NR. One such static TDM coordination is proposed in Third Generation Partnership Project (3GPP) and is referred to as HARQ timing case 1. One issue with the static TDM method is that this method may lead to restriction of UL NR slots (e.g., when using HARQ timing case 1), which leads to less utilization of NR.

The coordination can also be performed in a dynamic manner which may require coordination signaling with minor delay between LTE & NR schedulers of respective LTE and NR network nodes to help ensure non-overlapping of UL LTE and UL NR. However, such a method may not only add further complexity, but may also increase signaling load between LTE and NR network nodes. Further, this method may also add challenges to reach high efficiency when the signaling delay between the network nodes increases such as with distance or virtual random access network (vRAN).

The disclosure helps at least in part solve at least one problem with existing methods by helping avoid IMD in transmitted signals with different levels of coordination-requirements. In one or more embodiments, the scheduling and/or transmission schemes may not require any coordination between LTE network node and NR network node. As described herein, various methods are described to avoid scheduling LTE DL wireless device data and LTE UL in the same TTI (e.g., subframe), thus even if the IMD occurs, the IMD may not collide with an actual LTE DL transmission intended for the wireless device.

In one or more embodiments, at least some coordination between NR and LTE network nodes may be provided. The coordination may be used to activate/deactivate avoidance of the scheduling of LTE DL wireless device data and LTE UL in the same TTI, thereby improving spectrum utilization.

The teachings described directly address the IMD impact on DL wireless device data (data/signals transmitted from the network node to the wireless device). Of note, some embodiments described herein may not resolve the impact of IMD on DL reception created by the wireless device when the wireless device is not scheduled wireless device data, e.g., when performing Reference Signal Receive Power (RSRP) measurement, Channel Quality Indicator (CQI) measurement, and radio-link monitoring measurement. Thus, one or more embodiments are suitable when the IMD has a substantial impact on DL wireless device data only.

Further, for clarity, it is noted that the disclosure may describe embodiments applicable to the case of EN-DC, where LTE is the master RAT, EPC is the core network, and NR is the secondary RAT. The disclosure may also describe embodiments where the simultaneous UL transmissions can potentially introduce IMD that can degrade only the DL in LTE. However, one or more embodiments described herein are equally applicable to the general case where uplink transmission occurs in different frequency carriers such as simultaneous transmission in different carriers where IMD may impact the downlink. In particular, the disclosure is equally applicable to any configuration of LTE-NR DC where the simultaneous UL transmission can potentially introduce IMD on either LTE or NR, or both. Therefore, in general, one or more embodiments described herein may be applied to one or more of LTE UL carrier aggregation, NR UL carrier aggregation, LTE dual connectivity, NR dual connectivity, and LTE-NR UL carrier aggregation.

Before describing in detail exemplary embodiments, it is noted that the embodiments reside primarily in combinations of apparatus components and processing steps related to helping avoid intermodulation in wireless communication system implementing transmissions at different frequencies, e.g., two different frequencies. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, IAB node, access point, radio access point, Remote Radio Unit (RRU) Remote Radio Head (RRH).

The term Transmission Time Interval (TTI) used herein may correspond to any time period (T0) over which a physical channel can be encoded and interleaved for transmission. The physical channel is decoded by the receiver over the same time period (T0) over which it was encoded. The TTI may also be interchangeably called as short TTI (sTTI), transmission time, slot, sub-slot, mini-slot, short subframe (SSF), mini-subframe, subframe, etc.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

The term "signaling" used herein may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide for helping avoid intermodulation in wireless communication system implementing transmissions at different frequencies.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include an avoidance unit 32 which is configured to perform one or more functions described herein such as with respect to helping avoid intermodulation in wireless communication system implementing transmissions at different frequencies.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to one or more of determine, provide, process, receive, transmit, forward, relay, store, analyze, etc., information related to helping avoid intermodulation in wireless communication system implementing transmissions at different frequencies.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include avoidance unit 32 configured to perform one or more network node 16 functions described herein such as with respect to helping avoid intermodulation in wireless communication system implementing transmissions at different frequencies.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22.

Figure 2:
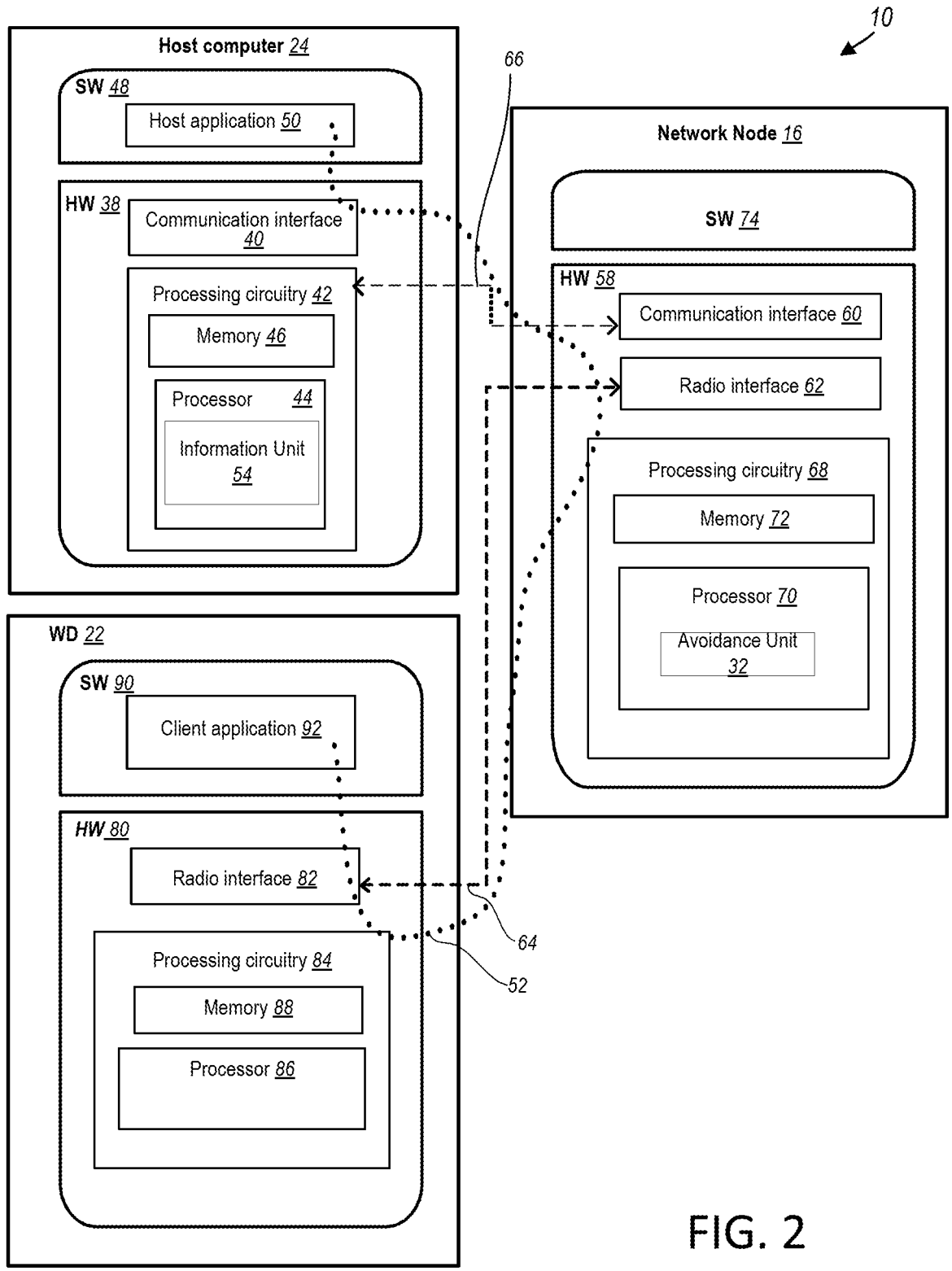
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as avoidance unit 32 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 3 is a flowchart illustrating an exemplary method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 4 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 5 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 6 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
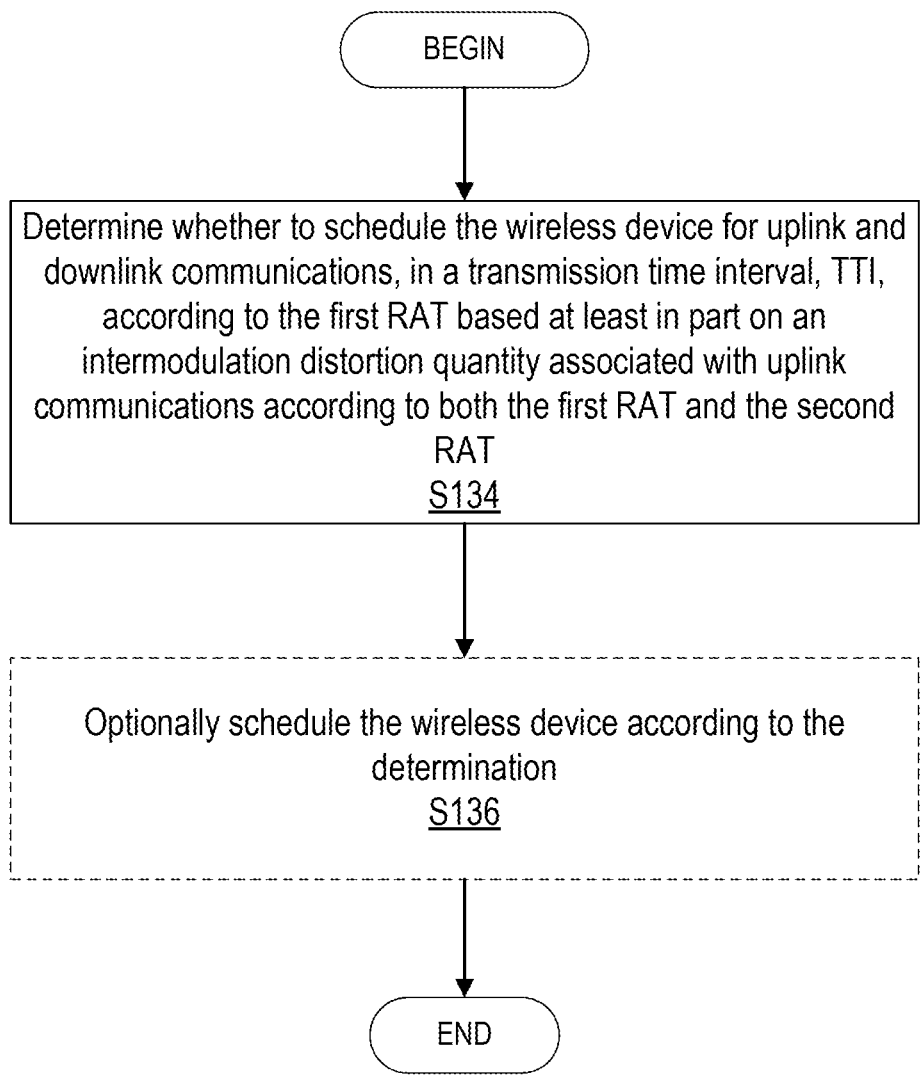
FIG. 7 is a flowchart of an exemplary process in a network node according to some embodiments of the present disclosure.

FIG. 7 is a flowchart of an exemplary process in a network node 16 in accordance with one or more embodiments of the disclosure. One or more Blocks and/or functions performed by network node 16 may be performed by one or more elements of network node 16 such as by avoidance unit 32 in processing circuitry 70, radio interface 62, etc. In one or more embodiments, network node 16 such as via one or more of processing circuitry 68, processor 70, avoidance unit 32, communication interface 60 and radio interface 62 is configured to determine (Block S134) whether to schedule the wireless device for uplink and downlink communications, in a transmission time interval, TTI, according to the first RAT based at least in part on an intermodulation distortion quantity associated with uplink communications according to both the first RAT and the second RAT. In one or more embodiments, the intermodulation distortion quantity is a calculated quantity that corresponds to an intermodulation distortion quantity that can be expected if a wireless device 22 is schedule for simultaneous uplink and downlink communications.

In one or more embodiments, the network node 16 may determine via processing circuitry and/or avoidance unit 32 that wireless device 22 is configured for uplink transmission on a first carrier using a first RAT and on a second carrier using a second RAT such that, in one or more embodiments, network node 16 may trigger and/or initiate IMD avoidance as described herein. For example, network node 16 may be an LTE network node 16 where wireless device 22 may first connect to the LTE network node 16 before initiating communication with the NR network node 16 as all control signaling from the wireless device 22 may be communicated through the LTE network node 16. The NR network node 16, in this example, may be used for additional data transmission for increased throughput.

In one or more embodiments, network node 16 such as via one or more of processing circuitry 68, processor 70, avoidance unit 32, communication interface 60 and radio interface 62 is configured to optionally schedule (Block S136) the wireless device according to the determination. According to one or more embodiments, the intermodulation distortion quantity associated with uplink communications according to both the first RAT and second RAT corresponds to a threshold quantity. According to one or more embodiments, the threshold quantity is based at least in part on previously received Hybrid Automatic Repeat Request, HARQ, feedbacks. According to one or more embodiments, the processing circuitry 68 is further configured to schedule the wireless device 22 for uplink and downlink communications according to the first RAT where a number of resources used for the downlink communication according to the first RAT is based at least in part on the intermodulation distortion quantity. In one or more embodiments, the number of resources scheduled for downlink communications in the first RAT may be based at least in part on whether uplink is scheduled in the first RAT for the wireless device 22. For example, if the wireless device 22 is scheduled for uplink communications in the first RAT, an IMD threshold may be used to determine the number of resources to use for downlink communications for the wireless device 22, as described herein. However, if the wireless device 22 is not scheduled for uplink communications in the first RAT, legacy resource scheduling may be used for determining the number of resources to use for downlink communications for the wireless device 22 as IMD may not be an issue.

According to one or more embodiments, the first RAT is a Long Term Evolution, LTE, based wireless communication protocol and the second RAT is a New Radio, NR, based wireless communication protocol. According to one or more embodiments, the intermodulation distortion quantity is set to a quantity that prevents scheduling of the downlink communication according to the first RAT. According to one or more embodiments, the processing circuitry 68 is further configured to avoid scheduling uplink communication, in the TTI, according to the first RAT if downlink communication according to the first RAT is scheduled in the TTI. According to one or more embodiments, the processing circuitry 68 is further configured to avoid scheduling downlink communication, in the TTI, according to the first RAT if the uplink communication according to the first RAT is scheduled in the TTI.

According to one or more embodiments, the processing circuitry 68 is further configured to receive, over a backhaul communications link, an indication indicating whether uplink communication according to the second RAT is scheduled. The determination whether to schedule the wireless device 22 for uplink and downlink communications, in the TTI, according to the first RAT is based at least in part on the indication. According to one or more embodiments, the determination whether to schedule the wireless device 22 for uplink and downlink communications, in the TTI, according to the first RAT is based at least in part on a quality of service class associated with one of the uplink communication and downlink communication, in the TTI, according to the first RAT.

According to another aspect of the disclosure, a network node 16 for communication with a wireless device 22 that is configured for uplink transmission on a first carrier using a first Radio Access Technology, RAT, and on a second carrier using a second RAT, is provided. The network node 16 includes processing circuitry 68 configured to determine whether to schedule the wireless device 22 for uplink and downlink communications, in a transmission time interval, TTI, according to the first RAT based at least in part on an intermodulation distortion threshold quantity associated with uplink communications according to both the first RAT and the second RAT. The processing circuitry 68 is further configured to optionally schedule the wireless device 22 according to the determination. The intermodulation threshold quantity is based at least in part on one of previously received Hybrid Automatic Repeat Request, HARQ, feedback, and a Physical Resource Block, PRB, allocation for the first RAT.

Having described the general process flow of arrangements of the disclosure and having provided examples of hardware and software arrangements for implementing the processes and functions of the disclosure, the sections below provide details and examples of arrangements for helping avoid intermodulation distortion in wireless communication system implementing transmissions at different frequencies.

Embodiments provide generally provide for helping avoid intermodulation in wireless communication system implementing transmissions at different frequencies as described in various examples below. In general, IMD may be expected to be generated when the same device transmits, simultaneously, on two different frequencies. Where the IMD appears or "lands" in the frequency spectrum may depend on the two frequencies. In one or more embodiments described herein, the IMD appears in the DL of LTE.

Example 1: Avoiding IMD Due to EN-DC without Coordination

In one or more embodiments, if the wireless device 22 is configured with EN-DC band combination (where it may be assumed that UL NR transmission has been scheduled in TTI X (e.g., subframe X)) that is expected to generate IMD that overlaps the LTE DL bandwidth, then a scheduler, i.e., processing circuitry 68 and/or avoidance unit 32, at the LTE network node 16 does not schedule DL LTE and/or UL LTE for the wireless device 22 in the same TTI, i.e., TTI X in this example. In one or more embodiments, without coordination, the LTE network node 16 may assume UL NR is scheduled, which may not always be the case but this assumption avoids coordination between the LTE and NR network nodes 16. In other words, the LTE network node 16 acts as if UL communications in NR is always scheduled for a wireless device 22 as long as the EN-DC band combination is expected to generate IMD.

In one or more embodiments, Example 1 may be implemented at the LTE network node 16 is as follows:

If an uplink transmission such as UL LTE transmission is already scheduled in TTI X, then the LTE network node 16 such as via processing circuitry 68 and/or avoidance unit 32 may not schedule any DL assignment in TTI X such that UL LTE transmission and DL LTE transmission are not scheduled to occur in TTI X as the intermodulation distortion expected from this configuration may be above a predefined threshold. In one or more embodiments, uplink transmission may include physical uplink shared channel (PUSCH) and Physical uplink control channel (PUCCH) where PUCCH may be used for a variety of functions such as for the transmission of HARQ acknowledgment (ACK)/negative ACK (NACK), scheduling request (SR), Channel State Information (CSI) feedback and other types of control information.

If a downlink assignment is already scheduled in TTI Y, then the processing circuitry 68 and/or avoidance unit 32 at the LTE network node 16 may not schedule any UL grants in TTI Y. Downlink assignment may include physical downlink control channel (PDCCH) and/or physical downlink shared channel (PDSCH) transmissions.

Example 2: Coping with IMD Due to EN-DC without Coordination

In one or more embodiments, if the wireless device 22 is configured with EN-DC band combination that is expected to generate IMD that overlaps the LTE DL bandwidth, then processing circuitry 68 and/or avoidance unit 32 at the LTE network node 16 schedules DL LTE transmission with a more robust modulation and coding scheme (MCS) when UL LTE transmission for this wireless device 22 is already scheduled in the same TTI. In one or more embodiments, Example 2 may be implemented at LTE network node 16 as follows:

If an uplink transmission is already scheduled in TTI X, then any DL assignment in TTI X may be scheduled by LTE network node 16 such as via processing circuitry 68 and/or avoidance unit 32 assuming the signal to interference noise ratio (SINR) is equal to $SINR_{estimated} - IMD_{th}$, where $SINR_{estimated}$ is the estimated signal-to-interference-and-noise-ratio (dB) and $IMD_{th}$ is a configurable threshold in dB, set to a value greater or equal to zero. In one or more embodiments, setting $IMD_{th}$ to a sufficiently high quantity may corresponds to Example 1 as the LTE DL transmission may not be scheduled in this case. A quantity sufficiently high may corresponds to a predetermined quantity and/or the quantity may be based on estimations. In one or more embodiments, estimation of SINR may be performed using any prior-art techniques.

If a downlink assignment is already scheduled in TTI Y, then processing circuitry 68 and/or avoidance unit 32 of the LTE network node 16 may not schedule any UL grants in TTI Y. Downlink assignment includes PDCCH and/or PDSCH transmissions.

In one or more embodiments, the $IMD_{th}$ may be determined and/or configured as a function of the physical resource block (PRB) allocation in DL LTE and UL LTE, so that $IMD_{th}$ is larger for more problematic allocations and vice versa.

Example 3: Advanced Coping with IMD Due to EN-DC without Coordination

Example 3 is similar to Example 2, except that $IMD_{th}$ is estimated based on success (HARQ ACKs) and failures (HARQ NACKs) of previous transmissions when there is simultaneous DL and UL transmissions in LTE, i.e., $IMD_{th}$ is based at least in part on HARQ feedback. In particular, similar to outer-loop link adaptation (OLLA) used to estimate SINR while maintaining a target BLER ($BLER_{target}$), the LTE network node 16 implements Example 3 as follows:

Processing circuitry 68 and/or avoidance unit 32 of the LTE network node 16 initializes $IMD_{th}$ when the wireless device 22 is first connected, using for example a configurable threshold, for example: $IMD_{th} := IMD_{th_{initial}}$ Upon receiving HARQ ACK/NACK associated with a DL LTE transmission:

If DL LTE transmission that was simultaneously transmitted with UL LTE, then processing circuitry 68 and/or avoidance unit 32 updates $IMD_{th}$ as follows:

$$IMD_{th} := IMD_{th} - \begin{cases} Step_{up} & \text{If } ACK \\ -Step_{up} \times \dfrac{1 - BLER_{target}}{BLER_{target}} & \text{If } NACK \end{cases}$$

Else: processing circuitry 68 and/or avoidance unit 32 uses the HARQ ACK/NACK to update the SINR estimate according to any prior-art link adaption algorithm (i.e., as it would be normally used without this invention, e.g., using conventional OLLA).

Example 4: Coping with IMD for PDCCH Due to EN-DC without Coordination

In this embodiment, if the wireless device 22 is configured with EN-DC band combination that is expected to generate IMD that overlaps, i.e., falls within, the LTE DL bandwidth and which causes and/or may cause decoding failure of the PDCCH channel by the wireless device 22, then processing circuitry 68 and/or avoidance unit 32 at the LTE network node 16 can schedule PDCCH more robust based on the following:

If a transmitted PDCCH is not correctly decoded by the wireless device 22, the network node 16 via processing circuitry 68, avoidance unit 32 and/or radio interface 62 can detect this by noticing that the expected reception energy on the UL channel associated with the PDCCH is below a certain threshold, and if that happens, the network node 16 can perform via processing circuitry 68 and/or avoidance unit 32 the following actions:

When it is time to transmit the next PDCCH in DL, the network node 16 may help ensure that the PDCCH transmission is performed with sufficient coding, i.e., more robust coding such as more redundancy or parity bits, in order to handle the expected IMD. In one or more embodiments, the calculated and/or estimated quantity of $IMD_{th}$ in Examples 2 and/or 3 can be used to by processing circuitry 68 and/or avoidance unit 32 to estimate the number of resources in the form of control channel elements (CCEs) that are needed for the PDCCH channel.

The network node 16 may ensure that once the PDCCH is detected as not received by the wireless device 22, the PDCCH is transmitted with the higher coding, as described above, for a predefined time duration or quantity of PDCCH transmissions performed. When the predefined time duration or quantity of transmitted PDCCH has passed, the "normal" coding of the PDCCH can be restored, i.e., less robust coding may be used. In one or more instances, the "normal" PDCCH coding may be performed using any well-known PDCCH adaption algorithm but may generally be less robust or have a higher user data rate and/or less redundancy bits.

Example 4 may be considered a reactive process as network node 16 reacts to decoding failures at the wireless device 22 that may be indicated via HARQ feedback and/or a lack of scheduled data transmission from the wireless device 22.

Example 5: Avoiding IMD Due to EN-DC with Static Coordination

In this embodiment, if the wireless device 22 is configured with EN-DC band combination that is expected to generate IMD that overlaps the LTE DL bandwidth and/or falls in the LTE DL bandwidth, the corresponding LTE and NR transmission are synchronized at the TTI (e.g., subframe) and slot levels. In one or more embodiments, the NR network node 16 via processing circuitry 68 and/or avoidance unit 32 uses time-division-duplexing (TDD) where the TDD pattern is first exchanged with the LTE network node 16. By using the TDD pattern, the LTE scheduler, i.e., processing circuitry 68 and/or avoidance unit 32, of the LTE network node 16 can activate any of Examples 1-4 such as only at LTE TTIs (e.g., subframes) overlapping with NR UL slots as specified by NR's TDD pattern. For instance, if NR network node 16 is using a periodic TDD pattern that has 3 DL slots followed by 1 UL slot, then any of Examples 1~4 may be activated for this wireless device 22 only up to 25% of the time.

Further, an additional process to help avoid of IMD may also be performed, as follows. When allocating periodic uplink signals to the wireless device 22 in advance, such as SRs, PUCCH CQI resources, or semi-persistent UL PUSCH grants, the scheduler, i.e., processing circuitry 68 and/or avoidance unit 32, at the LTE network node 16, for example, may help ensure that the period and the offset of such UL signals are chosen such that these periodic signals do not overlap with the NR UL slots.

Example 6: Avoiding IMD Due to EN-DC with Coordination

In one or more embodiments, if the wireless device 22 is configured with EN-DC band combination that is expected to generate IMD that falls in the LTE DL bandwidth, i.e., that overlaps the LTE DL bandwidth, then a connection (i.e., backhaul connection) between LTE network node 16 (i.e., eNB) and NR network node 16 (i.e., gNB) is established such that NR network node 16 and LTE network node 16 can exchange information related to EN-DC. In one or more embodiments, the NR network node 16 may inform, i.e., provide information, whenever there is no potential UL NR transmission expected and/or scheduled for a particular wireless device 22. The LTE scheduler, i.e., processing circuitry 68 and/or avoidance unit 32, at the LTE network node 16 may then use an IMD avoiding/coping procedure according to any of Examples 1-5 except, for example, when LTE network node 16 is informed that there is no potential UL NR transmission is expected for the wireless device 22.

Figure 8:
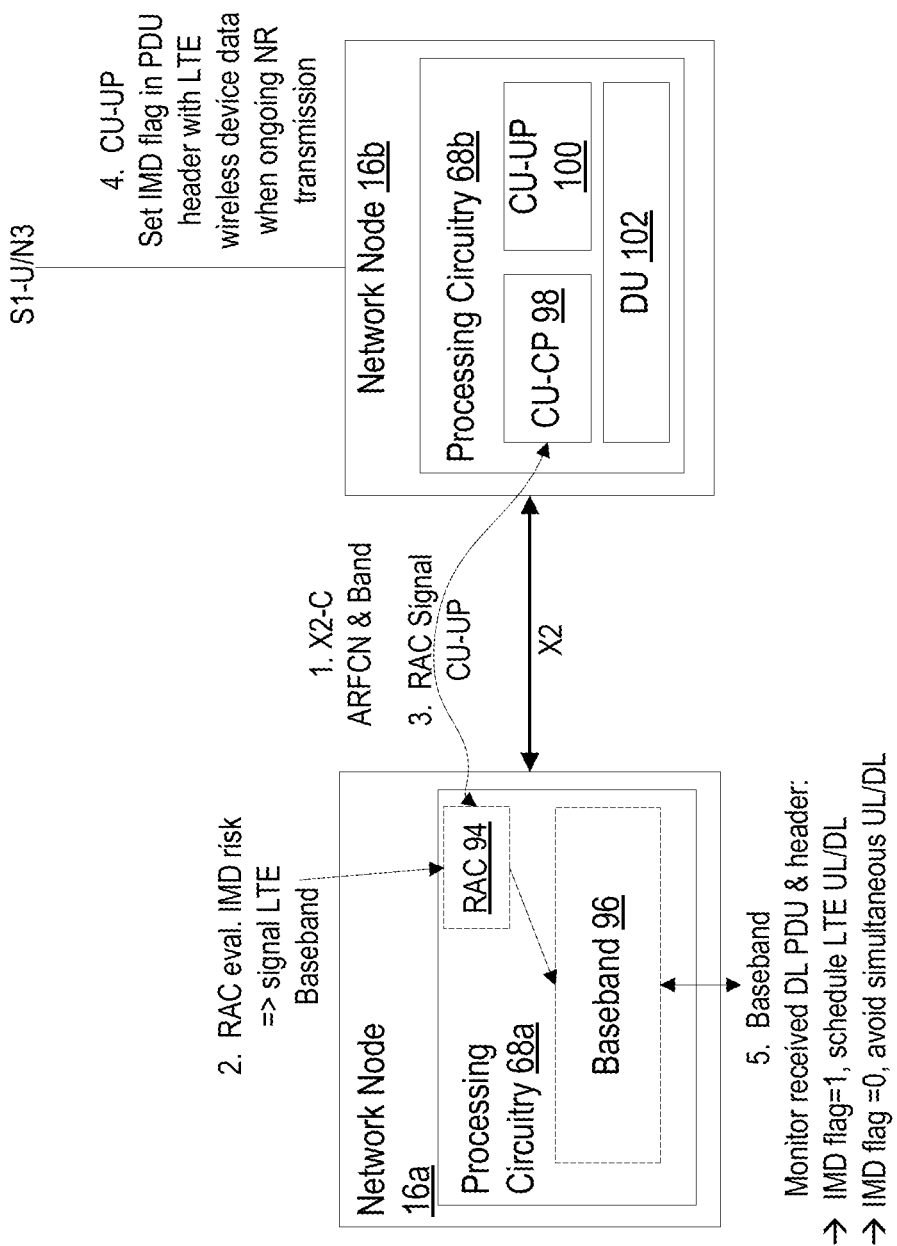
FIG. 8 is a diagram of an exemplary process of helping avoid IMD in accordance with some embodiments of the present disclosure.

In one or more embodiments, Example 6 is applied as follows where reference is made to FIG. 8 that illustrates network node 16a including processing circuitry 68a for providing one or more functions such as a RAC 94 function and/or baseband 96 function, and network node 16b for providing one or more functions such as a Central Unit (CU)-Control Plane (CP) 98 function, CU-User Plane 100 function, and a distributed unit 102 function.

1. NR network node 16b (e.g., NR RC/Central Unit (CU)-Control Plane (CP) 98), via radio interface 62 and/or communication interface 60, signals the available absolute radio frequency channel number (ARFCN) and frequency band supported in the NR network node 16b. In one or more embodiments, this general signaling functions are supported in existing systems.
2. At the LTE network node 16a, LTE radio admission control (RAC) 94 now has information of wireless device 22 capability, LTE network node 16a and NR network node 16b frequency and band supported. LTE RAC 94 may also know the frequency and band combinations with IMD risks, i.e., that are likely to have IMD above a certain threshold based on the frequency and/or band combinations. At configurations of EN-DC Date Radio Bearers (DRBs) with an IMD risk, this is signaled to baseband, which allows the restriction of simultaneous UL/DL LTE transmission=>default state is no simultaneous UL/DL transmission.
3. LTE network node 16a (LTE RAC) 94 may signal via radio interface 62 and/or communication interface 60 the NR network node 16 (CU-User Plane (UP)) 100 that the EN-DC bearer includes an IMD risk frequency combination where the CU-UP 100 enables IMD flag usage for every PDU sent to LTE network node 16a for transmission. In one or more embodiments, an IMD flag is added to each PDU frame sent from the NR network node 16b to the LTE network node 16a such that the IMD is applied based at least in part on the scheduling. Neither the LTE network node 16 to NR network node 16b signaling nor the IMD flag is provided in existing systems. Alternatives to this signaling is to use a parameter to configure or to have an "always on" configuration such as to allow the system to avoid the signaling requirement that may not be provided in existing systems and instead use an algorithm for one or more situations.
4. Every PDU sent to LTE network node 16a such as from the NR network node 16b (over X2-U or backhaul link, for example) may include an IMD flag:
   IMD flag=1 if wireless device 22 has no ongoing (and/or no expected) NR transmission;
   IMD flag=0 if wireless device 22 has ongoing (or expected) NR transmission;
   In one or more embodiments, ongoing may include unACKed NR package data convergence protocol (PDCP) protocol data units (PDUs) on NR. In one or more embodiments, ongoing may also consider how the EN-DC scheduling is configured/used. For example, if preferred UL and DL transmissions are NR, then every LTE PDU may risk IMD (e.g., IMD flag=0), while if only DL or both UL/DL are LTE preferred then the risk for IMD is better known in CU-UP 82 as CU-UP 82 has knowledge about the NR DL transmission and its connected L2 ACK signaling. DU may correspond to a distributed unit.

An LTE baseband processor, i.e., processing circuitry 68, of LTE network node 16a monitors the IMD flag and processing circuitry 68 and/or avoidance unit 32 determines whether UL/DL restrictions may apply in the scheduling. For example, IMD flag=1 corresponds to schedule LTE UL/DL, i.e., freely schedule with no IMD based restrictions.

In one or more embodiments, the IMD flag may be added to existing wireless standards such as in Third Generation Partnership Project (3GPP) Technical Specification (TS) 38.425 (user plane over X2-U, Xn-U and F1-U). In one or more embodiments, one of the spare bits in the second octet in PDU type 0 (as described in 3GPP TS 38.425 v15.3 and as shown in FIG. 9) is used for the IMD flag. A portion of the DL user data frame is illustrated in FIG. 9 where one of bits 4-7 in "Spare" portion of the frame may be used as an IMD flag.

Example 7: Considering IMD Only for One or More Traffic Types

In one or more embodiments, any of the previous Examples described above may be applied based on a preconfigured type of traffic. For example, a network operator may want to protect one or more traffic types from IMD such that scheduling and/or detection of one or more traffic types may trigger one or more of Examples 1-6. For instance, it might be desired to protect only signaling radio bearers (SRBs) and/or radio-bearers carrier voice-over-lte (VoLTE) traffic. Similarly, the network, such as via network node 16, may determine not to protect wireless device 22 data traffic from IMD by implementing additional processes such as Examples 1-6 since this wireless device data traffic may have less strict quality-of-service (QoS) requirements than other services.

In one or more embodiments, the wireless communication traffic to be protected is specified based at least in part on a subset of quality-of-service-class-indicators (QCIs). The network node 16 via processing circuitry 68 and/or avoidance unit 32 may then perform any of the Examples described above, i.e., perform IMD compensation described herein, if the data to be scheduled belongs to a QCI that matches one of the predefined QCIs in the subset of the protected QCIs. Otherwise, the network node 16 may not perform any of the Examples described above, i.e., proceeds as it would without implement the teachings of the disclosure.

In one or more embodiments, the network node 16 performs Blocks S134 and/or S136 based on one or more of the above Examples, as described herein. In one or more embodiments, Block S134 and/or one or more of Examples 1-7 may be triggered and/or initiated based at least in part on information received from the wireless device 22. For example, the wireless device 22 may determine via processing circuitry 84 that an IMD issue exist, and then may communicate this issue via radio interface 82 to the network node 16.

Therefore, in one or more embodiments, the disclosure advantageously helps avoid intermodulation in wireless communication system implementing transmissions at different frequencies, where the teachings described herein may advantageously provide one or more of:

reduced complexity compared to existing single uplink solution(s);

full utilization of NR bandwidth unlike existing single uplink solution(s);

improved throughput such as by using IMD-aware downlink link adaptation changes.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:
EN-DC E-UTRA-NR Dual Connectivity
HARQ Hybrid automatic request control
IMD Intermodulation distortion
LTE Long-term evolution
NR Next Radio It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node for communication with a wireless device that is configured for uplink transmission on a first carrier using a first Radio Access Technology (RAT) and on a second carrier using a second RAT, the network node comprising processing circuitry configured to:
   determine whether to schedule the wireless device for uplink and downlink communications, in a transmission time interval (TTI), according to the first RAT based at least in part on an intermodulation distortion quantity associated with uplink communications according to both the first RAT and the second RAT; and
   schedule the wireless device according to the determination, wherein the determination whether to schedule the wireless device for uplink and downlink communications, in the TTI, according to the first RAT is based at least in part on a quality of service class associated with one of the uplink communication and downlink communication, in the TTI, according to the first RAT.

2. The network node of claim 1, wherein the intermodulation distortion quantity associated with uplink communications according to both the first RAT and second RAT corresponds to a threshold quantity.

3. The network node of claim 2, wherein the threshold quantity is based at least in part on previously received Hybrid Automatic Repeat Request (HARQ) feedbacks.

4. The network node of claim 1, wherein the processing circuitry is further configured to schedule the wireless device for uplink and downlink communications according to the first RAT where a number of resources used for the downlink communication according to the first RAT is based at least in part on the intermodulation distortion quantity.

5. The network node of claim 1, wherein the intermodulation distortion quantity is set to a quantity that prevents scheduling of the downlink communication according to the first RAT.

6. The network node of claim 1, wherein the processing circuitry is further configured to avoid scheduling uplink communication, in the TTI, according to the first RAT if downlink communication according to the first RAT is scheduled in the TTI.

7. The network node of claim 1, wherein the processing circuitry is further configured to avoid scheduling downlink communication, in the TTI, according to the first RAT if the uplink communication according to the first RAT is scheduled in the TTI.

8. The network node of claim 1, wherein the processing circuitry is further configured to receive, over a backhaul communications link, an indication indicating whether uplink communication according to the second RAT is scheduled; and
   the determination whether to schedule the wireless device for uplink and downlink communications, in the TTI, according to the first RAT being based at least in part on the indication.

9. The network node of claim 1, wherein the first RAT is a Long Term Evolution (LTE) based wireless communication protocol and the second RAT is a New Radio (NR) based wireless communication protocol.

10. A method for a network node that is in communication with a wireless device that is configured to for uplink transmission on a first carrier using a first Radio Access Technology (RAT) and on a second carrier using a second RAT, the method comprising:
    determining whether to schedule the wireless device for uplink and downlink communications, in a transmission time interval (TTI), according to the first RAT based at least in part on an intermodulation distortion quantity associated with uplink communications according to both the first RAT and the second RAT; and
    scheduling the wireless device according to the determination, wherein the determination whether to schedule the wireless device for uplink and downlink communications, in the TTI, according to the first RAT is based at least in part on a quality of service class associated with one of the uplink communication and downlink communication, in the TTI, according to the first RAT.

11. The method of claim 10, wherein the intermodulation distortion quantity associated with uplink communications according to both the first RAT and second RAT corresponds to a threshold quantity.

12. The method of claim 11, wherein the threshold quantity is based at least in part on previously received Hybrid Automatic Repeat Request (HARQ) feedbacks.

13. The method of claim 10, further comprising scheduling the wireless device for uplink and downlink communications according to the first RAT where a number of resources used for the downlink communication according to the first RAT is based at least in part on the intermodulation distortion quantity.

14. The method of claim 10, wherein the intermodulation distortion quantity is set to a quantity that prevents scheduling of the downlink communication according to the first RAT.

15. The method of claim 10, further comprising avoiding a scheduling of uplink communication, in the TTI, according to the first RAT if downlink communication according to the first RAT is scheduled in the TTI.

16. The method of claim 10, further comprising avoiding a scheduling of downlink communication, in the TTI, according to the first RAT if the uplink communication according to the first RAT is scheduled in the TTI.

17. The method of claim 10, further comprising receiving, over a backhaul communication link, an indication indicating whether uplink communication according to the second RAT is scheduled; and
   the determination whether to schedule the wireless device for uplink and downlink communications, in the TTI, according to the first RAT being based at least in part on the indication.

18. The method of claim 10, wherein the first RAT is a Long Term Evolution (LTE) based wireless communication protocol and the second RAT is a New Radio (NR) based wireless communication protocol.

19. A network node for communication with a wireless device that is configured for uplink transmission on a first carrier using a first Radio Access Technology (RAT) and on a second carrier using a second RAT, the network node comprising processing circuitry configured to:
   determine whether to schedule the wireless device for uplink and downlink communications, in a transmission time interval (TTI), according to the first RAT based at least in part on an intermodulation distortion threshold quantity associated with uplink communications according to both the first RAT and the second RAT;
   schedule the wireless device according to the determination, wherein the determination whether to schedule the wireless device for uplink and downlink communications, in the TTI, according to the first RAT is based at least in part on a quality of service class associated with one of the uplink communication and downlink communication, in the TTI, according to the first RAT; and
   the intermodulation threshold quantity being based at least in part on one of:
     previously received Hybrid Automatic Repeat Request (HARQ) feedback; and
     a Physical Resource Block (PRB) allocation for the first RAT.

* * * * *